Patented Oct. 21, 1924.

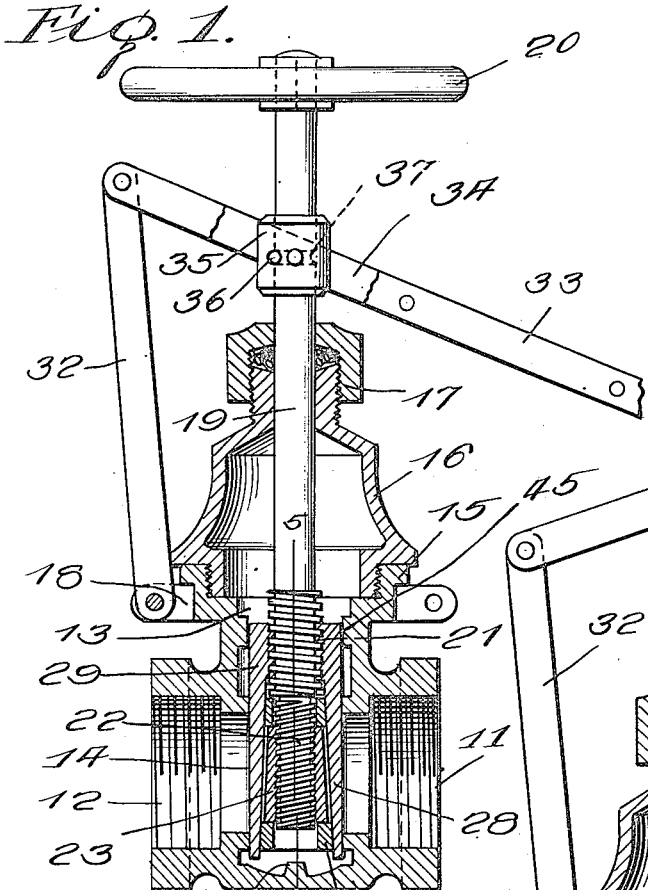
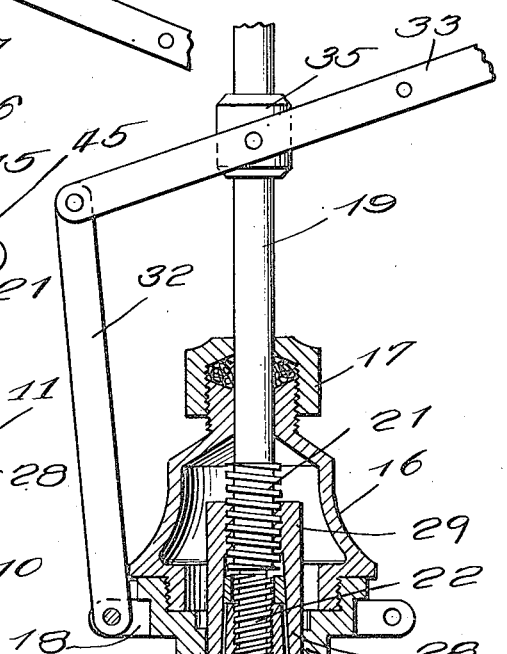
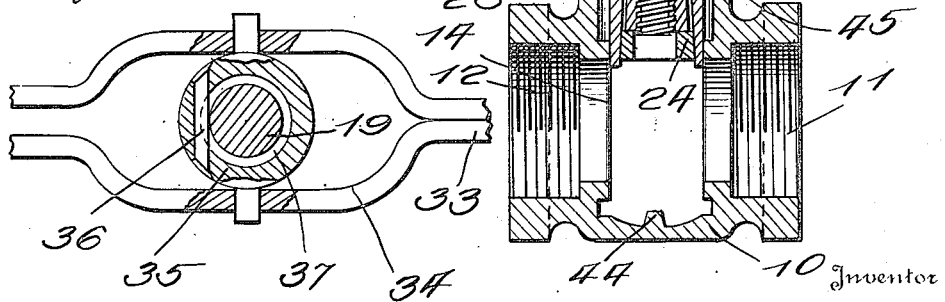

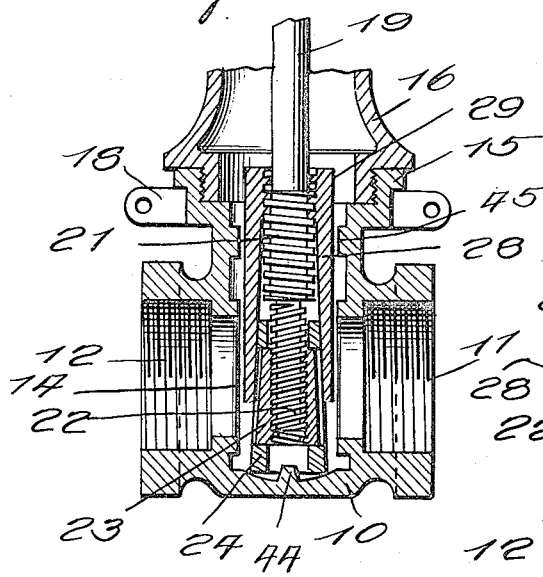
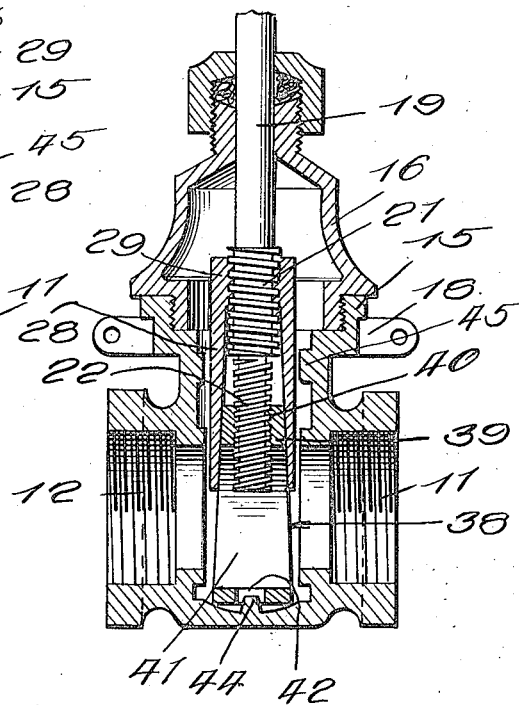
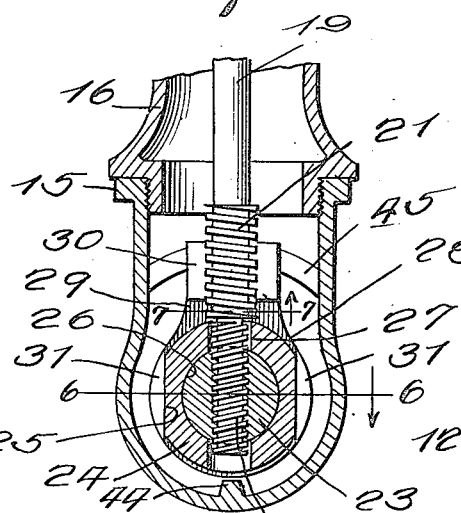
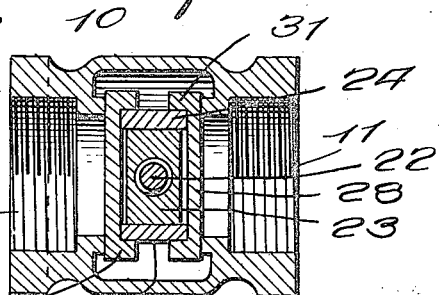
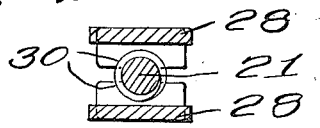

1,512,431

UNITED STATES PATENT OFFICE.

PAUL F. TROWE, OF HAMMOND, INDIANA.

GATE VALVE.

Application filed April 25, 1923. Serial No. 634,507.

*To all whom it may concern:*

Be it known that I, PAUL F. TROWE, a citizen of the United States, residing at Hammond, in the county of Lake and State of Indiana, have invented certain new and useful Improvements in Gate Valves, of which the following is a specification, reference being had to the accompanying drawings.

This invention relates to gate valves, and particularly to that character of gate valve in which a slidable and rotatable valve stem is used carrying disks which together constitute the valve proper, the stem carrying means whereby upon a rotation of the stem in one direction the valve disks will be forced against their seats and upon a rotation of the stem in the opposite direction the valve disks will be released from the seats to permit the valve to be shifted longitudinally out of or into coincidence with the seats.

One of the objects of this invention is to provide a quick operating valve of this character so constructed that the valve disks may be very quickly shifted into or out of engagement with the seats and whereby the valve disks may be forced outward at any desired elevation or depression of the valve to thereby hold the valve disks against the seats when the valve is partially open.

A further object is to provide a valve which is so constructed that the valve disks may be properly centralized in the valve body without any tendency to cramp the valve stem in case the valve seats are not machined accurately with relation to the longitudinal axis of the valve, this construction allowing the valve disks to seat properly without any tendency to bend the valve stem.

A still further object is to provide a valve of this character which requires only a fraction of a turn of the valve stem to unlock the valve and only a fraction of a turn of the valve stem to lock it again.

Another object is to provide a valve of this character in which the valve disks clean the seats when the valve is being closed.

Still another object is to provide a valve so constructed that a differential action is secured with regard to the vertical movement of the stem and the vertical movement of the valve disks so as to secure a relatively rapid opening or closing of the valve.

A further object is to provide a valve which will hold under high pressure of steam, water, air or oil, in which no vibration will affect the valve, causing the same to open or close, and in which repairs may be readily made.

Other objects will appear in the course of the following description.

My invention is illustrated in the accompanying drawings, wherein:—

Figure 1 is a vertical sectional view through a valve constructed in accordance with my invention and showing the valve closed;

Figure 2 is a like view to Figure 1 but showing the valve fully opened;

Figure 3 is a sectional view through the valve stem and collar 35;

Figure 4 is a fragmentary sectional view on the same plane as Figures 1 and 2 but showing the valve partially opened;

Figure 5 is a vertical sectional view through the valve shown in Figure 4 on the line 5—5 of Figure 1;

Figure 6 is a transverse section on the line 6—6 of Figure 5;

Figure 7 is a transverse section on the line 7—7 of Figure 5;

Figure 8 is a vertical sectional view of a modification.

Referring to the drawings, 10 designates the valve body having the inlet and outlet ports 11 and 12 of ordinary form. This body is formed to provide a valve receiving chamber 13 and valve seats 14. The upper end of the body is outwardly flanged, as at 15, and interiorly screw-threaded for the exterior screw-threads of the valve bonnet 16. This valve bonnet at its upper end is reduced and exteriorly screw-threaded to receive the usual packing nut 17. While on relatively small valves up to three inches in diameter the bonnet will have screw-threaded engagement with the valve body, I wish it understood that in valves of a larger type the bonnet may be held in place to the valve body by means of bolts. It will be noted that the bore of the bonnet is not screw-threaded. Preferably the upwardly extending neck of the valve body 10 will be provided with lugs 18 for a purpose to be later described.

Extending downward through the center of the bonnet and the packing nut is the valve stem 19, the upper end of which is many-sided for the reception of a valve wheel 20 constituting means whereby the valve stem may be rotated. The lower portion of the valve stem is formed for a portion of its length with a left hand screw-thread 21 which, for instance, in a 1¼″ valve will have four threads per inch, the threads being ⅛″ deep. The remainder of the valve stem is formed with a right hand screw-thread 22 having also four threads per inch, these threads being 1/16″ deep. The exterior diameter of the threads 21 is greater than the exterior diameter of the threads 22. The threads 22 will form a double entry screw, while the threads 21 constitute a single entry screw.

Mounted to operate upon the screw-threads 22 is a wedge nut 23. This is circular in side elevation, as shown in Figure 5, but has its side faces downwardly divergent with relation to each other and is interiorly screw-threaded to engage the screw-threads 22. Coacting with this wedge nut is a wedge member 24 which is approximately circular in elevation but has its circumference cut away to provide two flat sides 25. This wedge member is formed with a circular opening 26 extending transversely through the wedge and of a size to just receive the circular wedge nut 23. The wedge 24 is bored longitudinally, as at 27, for the passage of the valve stem. It will be noted from Figure 1 that the wedge 24 is thicker than the wedge 23 so that the wedge 23 does not extend out beyond the wedge 24 but is entirely housed therein.

Coacting with the wedge nut 23 and the wedge 24 are the valve disks 28. These are circular in form but have an upwardly extending neck 29 with outwardly extending wings, these wings being interiorly screw-threaded to constitute a half nut 30 having four threads to the inch and these threads being left hand. These half nuts 30 engage the screw-threads 21. The outer face of each valve disk is flat and disposed normally in a plane parallel to the longitudinal axis of the valve stem. The inner face of the valve disk, however, is at a slight inclination to the outer face, as shown clearly in Figure 4, and at opposite points on the disks are formed with the outwardly projecting lugs 31. The flat faces 25 of the wedge 24 confront the inner faces of these lugs 31 and are guided thereby, or it may be said that these flat faces 25 act to guide the valve disks and prevent such valve disks from moving laterally. The upper ends 29 of the valve disks are disposed in the central bore 13 of the valve body 10 above the seats and, as before stated, engage the screw-threads 21. It will be obvious now that when the valve stem is turned in one direction, the nut 23 with its wedge 24 and the valve disks 28 will be shifted in relatively opposite directions by the right and left hand screw-threads 21 and 22.

For the purpose of shifting the valve stem longitudinally, I mount upon the lugs 18 the upwardly extending radius link 32 and pivot upon the upper end of this radius link the lever 33 which is formed, as illustrated in Figure 3, of two strips of metal riveted together. This lever intermediate its ends is outwardly bowed, as at 34, to surround or embrace the valve stem. Mounted upon the valve stem is a swiveled nut 35 bored for the passage of the valve stem and transversely bored for the passage of a pin 36. The valve stem has a circumferential channel 37 formed in it and when the lever 33 is in place and the swiveled nut 35 is in place, this pin 36 extends through the transverse passage in the swiveled nut and intersects this circumferential groove 37, the ends of the pin being received in openings in the outwardly bowed portions 34 of the lever 33. It will be obvious now that when the lever is vertically shifted, the valve stem will be vertically shifted.

In Figure 8, I illustrate a modification of the wedge 24 and the wedge nut 23 comprising a wedge-shaped body 38 having its two outer faces disposed in downwardly divergent relation, this wedge-shaped body having an approximately circular lower portion and an upwardly extending neck 39, this neck being interiorly screw-threaded, as at 40, and being adapted to engage with the threads 22. The lower portion of this body 38 has a circular opening 41 of the same diameter as the ports 11 and 12. It also has an opening 42 in its lower end. The side faces of the circular body are cut away, as at 43, so as to fit between the guide flanges 31 of the valve disks. It will be seen that this body 38 has approximately the same form as the valve disks. The body of the valve is formed at the bottom of the chamber 13 with a centering lug 44 coacting with this opening 42, and the same is true of the valve of Figures 1 to 7.

In assembling the parts shown in Figures 1 to 6, the wedge nut 23 is disposed within the central opening 26 of the wedge 24. The valve stem is applied through the small end of the wedge 23. After the wedge and the wedge nut are disposed upon the portion 22 of the valve stem, the valve disks are applied to each side of the tapered wedge. When these parts are assembled they are applied to the valve body by turning the valve stem 19 counterclockwise until the valve disks will slip into the valve body and be disposed opposite the seats 14 thereof.

The valve bonnet 16 is then screwed on the valve body, the packing nut 17 is then put in place, the grip wheel 20 is then attached, and the stem overturned thereon, after which the lever 33 is put in place in an obvious manner.

In operating the valve constructed in accordance with Figures 1 to 6, the grip wheel is pushed downward either by hand or by the operating lever 33 and then the valve stem is turned clockwise, which will act to draw the wedge 24 upward through the action of the nut 23 and at the same time force the valve disks downward and this will lock the valve closed. To open the valve, the grip wheel is turned counterclockwise a fraction of a turn. This causes relative movement of the wedge 24 and the valve disks until the valve disks are released from engagement with their seats and then the valve stem will be pulled upward until the valve is fully opened or is opened to the amount desired. When this has been secured the grip wheel is turned clockwise again and this acts to force the valve disks outward and against the seats and locks the valve in the desired open position.

Where the wedging member 38 is used (see Fig. 8) the valve can be opened by turning the grip wheel counterclockwise and this will cause the valve stem to travel upward on the threads 39, while the threads 21 will act to simultaneously lift the valve disks. Thus a differential action is secured because the valve stem is rising up and at the same time the valve disks are lifted. The tapered wedge continues to bear against the bottom of the chamber 13 and the steam, water or other liquid passes through the opening 41 in the member 38. It will be obvious that a reverse movement of the valve stem will cause the stem to move downward and the valve disks to move downward at the same time and that as they move downward they will be forced outward and against the seat by engagement with the inclined outer faces of the wedge member 38. It will be seen that when this wedge member 38 is used, the valve is very quick acting, as when the stem is traveling up on the right hand entry threads on the wedge, at the same time the valve disks are traveling up on the left hand threads on the stem.

It is to be particularly noted that the valve disks in Figure 1 do not come in contact with the wedge nut 23. This is necessary for the reason that this wedge nut must have free movement within the wedge 24 so as to allow the wedge 24 and the valve disks 28 to properly centralize in the valve body and not cramp the valve stem in the valve bonnet in case the valve seats 14 are not machined properly with relation to the axis of the bore of the bonnet. This construction permits the valve disks to seat properly even in case of the valve seats not being properly machined and without any bending of the valve stem.

It will be seen from Figures 1 to 8 that the receiving chamber of the valve body is formed with lugs 45, these lugs being cast in the body and being semi-circular and disposed on each side of the valve chamber. The faces of these lugs are machined true to the valve seats so that when the valve is locked wide open as, for instance, in Figure 2, the middle portions of these disks will be forced against these lugs, while at the same time the lower part of the disks are forced against the extreme top of the valve seats. Thus there is no chance for the valves 29 to open laterally when they are raised and so become disconnected from the screw-threads 21.

While I have heretofore given certain dimensions which may be used with an inch and a quarter valve, it will be understood that these dimensions are simply to give an instance of the valve construction and that the sizes of the threads and the pitches of the threads would be in proportion to the size of the valve and that all of the sizes and proportions given would be varied.

It is to be understood that the lever 33 and its attendant parts are not necessary on valves smaller than three-inch valves but that this lever should be used on larger valves. I, of course, do not wish to be limited to the particular means whereby the valve is lifted, in other words to the lever 33 and its attendant parts, as other means might be used for this purpose without departing from the spirit of the invention. Valves constructed in accordance with my invention can be opened very quickly, inasmuch as it takes but a fraction of a turn of the valve stem in a counterclockwise direction to unlock the valve and then the stem may be shifted readily in one direction or the other to any amount desired and locked in position by a movement of the valve stem in a clockwise direction.

Where the wedge 24 with the nut 23 are used, the valve will act to clean the seats 14 when the valve is being closed. Thus when the valve disks are unlocked they are just free to travel up on the valve seats 14 and when the valve is being closed it automatically cleans the seats, as the valve disks are practically against the seats 14 in the valve body at all times.

In actual practice this valve has been found to hold fluid under high pressure and it has been further found that no vibration will affect this valve. Thus the valve may be used as a blow-off valve on a locomotive without any danger of the valve chattering. It will be obvious that the valve may be readily taken apart for repair or for regrinding and that this makes the valve easily repairable. There are no threads on the valve stem which will wear out and make a new bonnet necessary.

I claim:—

1. A gate valve comprising a body having oppositely disposed seats, a stem extending into the body having reversed screw-threads, valve disks on opposite sides of the stem coacting with the respective seats and having engagement with one of the threads, and a wedge disposed between the disks and having engagement with the other of said threads whereby to cause relatively opposite movements of the wedge and valve disks upon a rotation of the stem.

2. A gate valve comprising a body having oppositely disposed valve seats, a stem extending into the body having reversed screw-threads, valve disks on opposite sides of the stem coacting with the respective seats and having screw-threaded engagement with one of the threads of the stem, a wedge disposed between the disks and having screw-threaded engagement with the other of said threads, and means exterior to the body for giving a rectilinear movement to the valve stem.

3. A gate valve comprising a body having oppositely disposed seats, a bonnet engaging the body, a stem extending into the body through said bonnet and having rectilinear movement in the bonnet, the stem having two screw-threads reversed relative to each other at its end opposite the bonnet, valve disks disposed on opposite sides of the stem and coacting with the respective seats, each valve disk having an upwardly extending screw-threaded neck, the necks of both disks engaging one set of screw-threads adjacent the bonnet, and a wedging member having a screw-threaded aperture engaging the other set of threads and disposed between the valve disks.

4. A gate valve comprising a body having oppositely disposed seats, a stem extending into the body and having reversed screw-threads, valve disks on opposite sides of the stem and coacting with the respective seats, each valve disk having interrupted screw-threads engaging with one thread of the stem, a wedging member disposed between the disks and having a central aperture, and a nut disposed in said aperture and threaded for engagement with the other thread on the stem.

5. A gate valve comprising a body having oppositely disposed seats, a chamber extending upward from the body between the seats, a stem extending into the body having its lower portion formed with reversed screw-threads, the screw-threads at the lowest end of the stem having a less diameter than the screw-threads immediately above the lowest end, a wedging member having screw-threaded engagement with the threads of least diameter, opposed valve disks on each side of the wedging member and adapted to coact with the seats, each valve disk having an upwardly extending neck, and a semi-circular threaded portion engaging the upper thread of the stem.

6. A gate valve comprising a body having oppositely disposed seats, a chamber extending upward from the body between the seats, a stem extending into the body having its lower portion formed with reversed screw-threads, the screw-threads at the lowest end of the stem having a less diameter than the screw-threads immediately above the lowest end, a wedging member having screw-threaded engagement with the threads of least diameter, opposed valve disks on each side of the wedging member and adapted to coact with the seats, each valve disk having an upwardly extending neck, a semicircular threaded portion engaging the upper thread of the stem, the stem being mounted for rectilinear movement on the valve body, and means exterior to the valve body for shifting the stem rectilinearly.

7. A gate valve comprising a body having oppositely disposed seats, the body having an upwardly extending chamber between the seats, a bonnet engageable with the upper end of the chamber, a valve stem having sliding engagement through the bonnet, the lowest portion of the valve stem having screw-threads extending in one direction and the portion immediately above this lowest portion having screw-threads extending in the opposite direction, the first named screw-threads having a less diameter than the second named screw-threads, a wedging member disposed to engage the first named set of screw-threads, oppositely disposed valve disks disposed on each side of the wedging member and coacting with said seats and having upwardly extending necks formed with interiorly screw-threaded recesses adapted to engage with the second named threads on the stem, and means exterior to the body operatively engaging the stem whereby the stem may be shifted longitudinally, said means permitting the independent rotation of the stem.

8. A gate valve comprising a body having oppositely disposed seats and formed with a chamber between the seats, a stem extending into the body and into said chamber, the stem adjacent the bottom of the body being formed with screw-threads extending in one direction and above these screw-threads with threads extending in the opposite direction, the first named threads being less in diameter than the second named threads, a wedging member having a bore adapted to permit the passage of the stem, said wedging member having a transverse bore, a nut insertible into and fitting the transverse bore and having a longitudinal screw-threaded passage adapted to engage the first named threads, the nut having a thickness less than the thickness of the wedging member, oppositely disposed valve disks coacting with said seats and disposed on each face of the wedging member, the valve disks having upwardly extending necks disposed within said chamber and formed with interiorly screw-threaded recesses adapted to engage with the second named screw-threads and embrace the valve stem, and means on the exterior of the valve body whereby the stem may be axially shifted, said means permitting the independent rotation of the stem.

In testimony whereof I hereunto affix my signature.

PAUL F. TROWE.